United States Patent

[11] 3,596,178

| [72] | Inventors | Anatoly Grigorievich Sklyaruk |
| | | ulitsa, 4 proezd Krupskoi, 2, kv. 36; |
| | | Viktor Yakovlevich Shaevich, ulitsa |
| | | Kommunarov, 290, kv. 28, both of |
| | | Krasnodar, U.S.S.R. |
| [21] | Appl. No. | 812,751 |
| [22] | Filed | Apr. 2, 1969 |
| [45] | Patented | July 27, 1971 |
| [32] | Priority | Nov. 18, 1966 |
| [33] | | U.S.S.R. |
| [31] | | 1114306 |

[54] DEVICE FOR MEASURING ELECTRICAL QUANTITIES WITH ADJUSTABLE MAXIMUM AND MINIMUM THRESHOLD LIMITATION
6 Claims, 7 Drawing Figs.

[52] U.S. Cl. ................................................. 324/96,
116/129, 350/286, 250/227, 250/231
[51] Int. Cl. .......................................................... G01r 31/00
[50] Field of Search............................................ 324/96, 97;
250/227, 230, 231; 340/266; 116/129

[56] References Cited
UNITED STATES PATENTS
3,054,928  9/1962  Schrenk ........................ 250/231
3,329,825  7/1967  Enright ......................... 250/231

Primary Examiner—Michael J. Lynch
Attorney—Waters, Roditi, Schwartz & Nissen

ABSTRACT: A device for measuring electrical quantities with adjustable maximum and minimum threshold limitation comprises an electrical meter movement with a flag secured to a moving part which flag intercepts the luminous flux from a light source aligned with the axis of the moving part, a light conductor made of material whose refraction factor differs from that of air, and light sensitive elements sensing the luminous flux passing through the light conductor, the sensitive elements being adapted to be displaced when setting a prescribed threshold limitation. The light conductor is made in the form of a stepped biconcave lens with an optical axis coinciding with the axis of the moving part, the steps of the lens being formed by concentric surfaces limiting the lateral faces of the lens and remote from the optical axis by different radii. The step of smaller radius has a recess accommodating a light source, while the step of larger radius is provided with a concave surface for complete internal reflection of the luminous flux of the light source.

DEVICE FOR MEASURING ELECTRICAL QUANTITIES WITH ADJUSTABLE MAXIMUM AND MINIMUM THRESHOLD LIMITATION

The present invention relates to apparatus for measuring electrical quantities with adjustable maximum and minimum threshold limitation intended primarily for large-angle pointer-type indicating instruments.

Known in the art are devices for measuring electrical quantities with adjustable maximum and minimum threshold limitation comprising a movement which includes a moving part and a flag intercepting a luminuous flux of a light source, a light conductor made of transparent material having a refraction factor differing from that of air, and light sensitive elements sensing the luminous flux and capable of being moved along a geometrical circle when setting a prescribed value of the quantity being controlled, the circle being coaxial to the axis of the moving part, and actuating elements of the circuit.

In one of the known devices for measuring electrical quantities with adjustable maximum and minimum threshold limitation the light conductor is made of a shaped plate of transparent material formed by arcs having different radii; the top of the arc having the smaller radius has a recess accommodating a light source, while the other arc has a chamfer reflecting the luminous flux, and a working surface serving for yielding the luminous flux to light sensitive elements mounted on master setting pointers. Secured to the pointer of the moving part of the measuring instrument is a shield flag which intercepts the luminous flux directed onto the light sensitive elements, this resulting in operation of an actuating circuit.

The prior art devices, such as the above, have the following disadvantages: they do not provide for a sufficiently large angle of deflection of the measuring instrument moving part due to the nonuniformity in the luminous flux directed onto he light sensitive element and, furthermore, these devices are characterized by high losses of light and this adversely affects the accuracy of control and makes the actuating circuit configuration more complicated.

Also known in the art are devices with a light source which is coaxial to the axis of the moving part of the movement. These devices have the following disadvantages: a significant error due to difficulty in bringing the light source in strict alignment with the above axis and insufficient utilization of the light flux due to its nonuniformity and diffusion.

An object of the present invention is to eliminate the above mentioned disadvantages and to provide a device for measuring electrical quantities with adjustable maximum and minimum threshold limitation having a high sensitivity, high accuracy in operation, simple construction, and providing for the possibility of accurate adjustment when the angle of rotation is as large as 360°.

Another object of the invention is to provide a device for measuring electrical quantities with adjustable maximum and minimum threshold limitation which is essentially free from the influence of external light sources.

Still another object of the invention is to provide a device for measuring electrical quantities with adjustable maximum and minimum threshold limitation which is sufficiently versatile and may be used in measuring instruments having various overall dimensions and featuring a different angle of deflection.

A particular object of the present invention is to provide such a shape of the light conductor which ensures a uniform luminous flux at considerable angles of deflection of the moving part.

With these and other objects in view, the present invention resides in a device for measuring electrical quantities with adjustable maximum and minimum threshold limitation comprising an electrical meter movement with a moving element and a flag secured thereto, said flag being used for interception the luminous flux from a light source aligned with the axis of the moving part, a light conductor made of transparent material having a refraction factor differing from that of air, light sensitive elements sensing the luminous flux and capable of being moved about a geometrical circle coaxial to the axis of said moving part when setting a predetermined value of the quantity being controlled, and actuating elements of the circuit.

In this device the light conductor is, according to the invention, in the form of a stepped biconcave lens whose optical axis coincides with the axis of the moving part, the lens steps being formed by several concentrical surfaces which limit the lateral faces of said lens and are spaced from the above optical axis by different radii, the step of smaller radius of the lens having a recess for accommodating a light source, while the step with the larger radius has a concave section to provide for a complete internal reflection of the luminous flux of the light source.

It is expedient that the concave surface of the outer step and the surface of the recess of the inner step of the light conductor be formed by spherical surfaces or, as a variety, by conical surfaces or by a combination of both.

According to another embodiment of the invention, in order to increase the degree of utilization of the light conductor, its surface, with the exception of the surface of the recess in which the light source is located and the lateral face formed by the concentrical surface the most remote from the optical axis and directing the luminous flux to the light sensitive element, is coated with light-reflecting material.

In the other form of the invention the concave section of the outer step, employed for internal reflection of the luminous flux, is limited by a corrugated surface transverse to the optical axis of the light conductor. This ensures still more uniform distribution of the luminous flux.

Further objects and advantages of the present invention will become more readily apparent and the invention will be better understood by reference to the following description taken in connection with the accompanying drawings wherein embodiments of the invention are illustrated by way of example.

Figure 1:
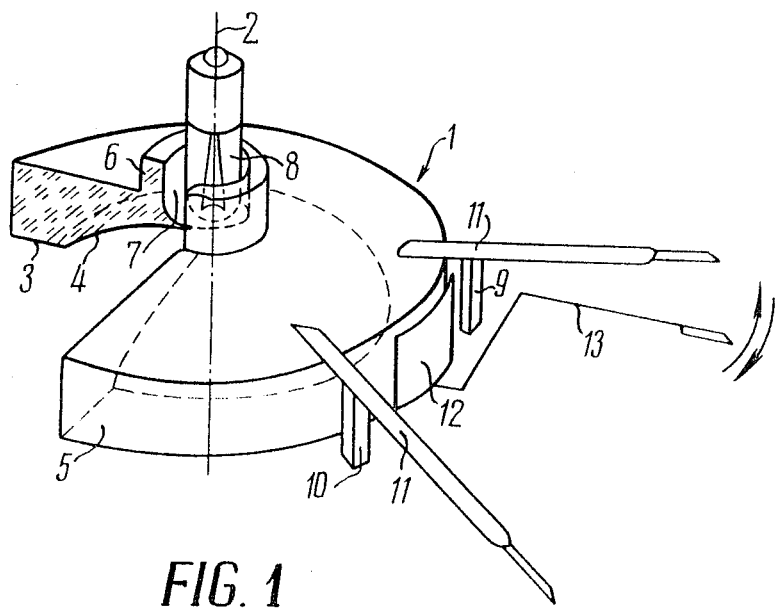
FIG. 1 is a perspective view of a device for measuring electrical quantities with adjustable maximum and minimum threshold limitation according to the invention.
Figure 2:
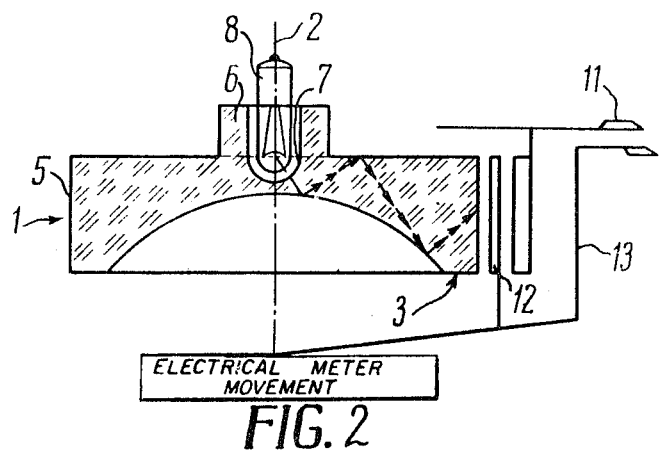
FIG. 2 is a side sectional view of the device.

According to the invention, the device is provided with a light conductor 1 (FIGS. 1,2) made of transparent material having a refraction factor differing from that of air, which conductor is made in the form of a stepped biconcave lens with an optical axis 2, and consisting of a large step 3 having a concave section 4, a lateral face 5 which serves as the main working surface for yielding the luminous flux, and a small step 6 having a recess 7 accommodating a light source 8. Located opposite the face 5 are light sensitive elements 9 and 10 which are mounted on a master setting pointer 11. A flag 12 secured to a pointer 13 of the moving part of an electrical measuring instrument travels between the lateral face 5 and a surface concentric thereto along which the light-sensitive elements 9 and 10 move.

The lateral faces of the steps 3 and 6 of the light conducting lens are at different distances from the optical axis 2 and formed by concentric cylindrical surfaces.

The luminous flux from the light source 8 accommodated within the recess 7 of the step 6 passes through the light conductor and, repeatedly reflecting and refracting from its internal surfaces, particularly from the concave section, arrives at the light-sensitive sensitive elements 9 and 10 through the lateral face 5.

During the movement of the pointer 13 of the moving part of a conventional electrical measuring instrumental, the flag 12 secured on said moving part prevents the luminous flux from falling onto the light-sensitive elements 9 and 10 inserted into the measuring circuit.

Figure 3:
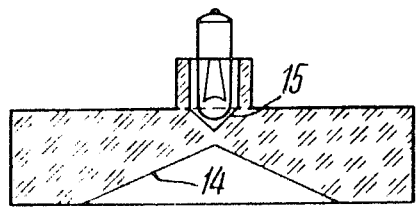
FIG. 3 is a side sectional view of another embodiment of light conductor in the device, according to the invention, with conical surfaces of the concave section of the major step and with a recess for accommodating a light source.
Figure 4:
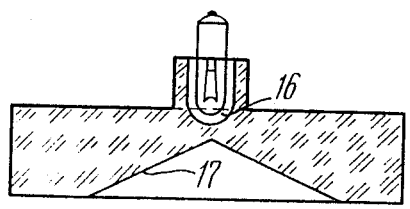
FIG. 4 is a side sectional view of another embodiment of light conductor with a spherical surface of a recess in the small step and a conical concave section of the large step.

The shape of the light conductor is instrumental in that only the reflected and refracted beams pass through the lateral face 5 to the light-sensitive elements 9 and 10, while the direct refracted beams from the light source 8 are shielded due to the reflection from the internal surfaces of the light conductor 1, particularly from the surface of the lateral face of the smaller step 6. The concave section of the larger step and the recess in the smaller step can also be formed by conical surfaces 14 and 15 (FIG. 3) or by a combination of a spherical and conical surfaces 16 and 17 (FIG. 4). The choice of the surfaces forming the concavity depends on the geometrical size of the light conductor, the dimensions of the measuring instrument and technological requirements.

The present shapes of the light conductor make it possible to obtain practically uniform distribution of the luminous flux over a perimeter with an angle up to 360° and this is advantageous when using pointer-type measuring instruments with an angle of deflection of the moving part up to 270° as well as when using pointer indicators with an angle of deflection of 320°.

Figure 5:
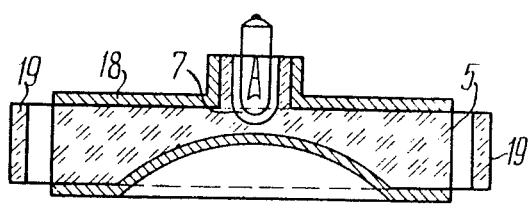
FIG. 5 is a side sectional view of an embodiment of the light conducting lens, according to the invention, provided with a light-reflecting coating and a light filter.

A portion of the surface of the light conductor, which is essentially used for internal reflection of the luminous flux, with the exception of the surfaces of the recess 7 and the lateral face 5, may be coated with light-reflecting material 18 (FIG. 5) for improving reflection.

The light conductor 1 may be provided with a light filter 19 for limiting the influence of external light sources upon the light-sensitive elements by selecting light waves of a definite length from the luminous flux, the accepted light sensitive elements having a prescribed sensitivity within the region of the above length.

Figure 6:
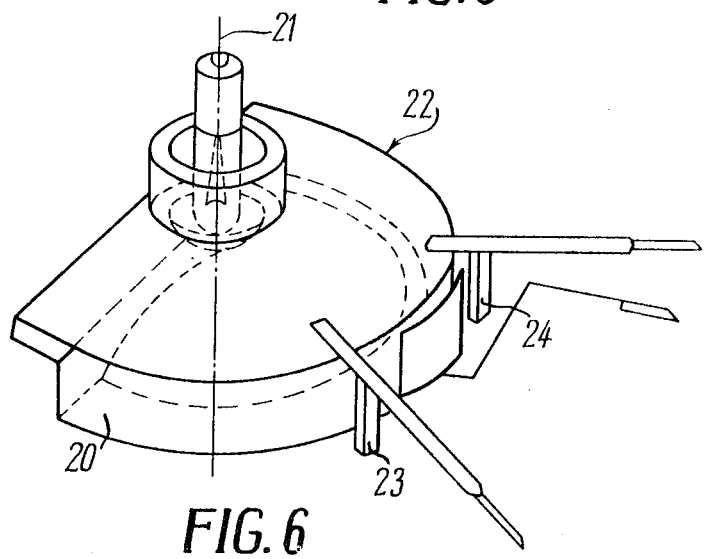
FIG. 6 is a perspective view of a device for measuring electrical quantities with adjustable maximum and minimum threshold limitation intended for a measuring instrument with an FIG. of deflection about 160°.

Depending upon the angle of rotation of the moving part of the movement employed, for example at an angle of 160° (FIG. 6), a lateral face 20 (FIG. 6) formed by the concentric surface which is the most remote from an optical axis 21 and used for directing the luminous flux which has been repeatedly reflected and refracted, from a light conductor 22 onto light-sensitive elements 23 and 24 located opposite to said concentric surface, is preferably made with an angular length exceeding the angle of rotation of the above moving part.

Figure 7:
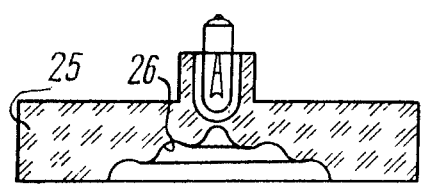
FIG. 7 is a side sectional view of a light conductor with a corrugated concave section of the major step.

To obtain a directed luminous flux and to improve the uniformity of its distribution in a predetermined direction, a light conducting lens 25 (FIG. 7) may be made so that at least part of the said lens (the concave section) is limited by a corrugated surface 26 oriented in such a manner that it is transverse to the optical axis of the light conducting lens. FIG. 7 illustrates a concave section of a generally conical contour made with a corrugated surface 26 which in some cases, for example at considerable geometrical size of the light conductor, provides for a more uniform distribution of the luminous flux.

It will be understood by those skilled in the art that the embodiments of the invention herein shown and described are to be taken as preferred embodiments only, and that various changes in the shape, size and arrangement of parts may be resorted to, without departing from the spirit and scope of the invention. For example, the above-described components, shown in the appended drawings, may be replaced by equivalent parts, the position of some components may be changed, some elements of the invention may be used independently of the other, etc., provided all these changes and modifications are within the scope of the invention as defined in the appended claims.

We claim:

1. A device for measuring electrical quantities with adjustable maximum and minimum quantity detection comprising in combination; an electrical meter movement with movable means positioned about an axis by an angle depending on the electrical quantity being measured; a light source in alignment with the axis of said movable means; a light conductor of transparent material having a refraction factor differing from the refraction factor of air, said light conductor being constituted as a two-step, biconcave lens with an optical axis coinciding with the axis of said movable means, the steps of said lens being formed by concentric lateral surfaces limiting the lateral faces of the lens and spaced from the optical axis by different radii, the concave surface of the step which is limited by the lateral surface with the smaller radius forming a recess accommodating said light source, the concave surface of the step with the larger radius providing for complete internal reflection of the light of said light source except at the lateral face thereof; first and second light-sensitive means positioned adjacent the lateral face of the step having the larger radius, said light-sensitive means being separately positionable about the axis of said movable means to define respectively the maximum and minimum quantities; and a flag mounted on said movable means for intercepting the light passing from the lateral face of the step having the larger radius to a respective one of said light sensitive mean when one of said maximum and minimum quantities is measured.

2. A device as claimed in claim 1 comprising light reflecting material on said light conductor in the regions outside said recess and the lateral face of the step having the larger radius.

3. A device as claimed in claim 1, in which the concave surface of the step having the larger radius and said recess are formed by spherical surfaces.

4. A device as claimed in claim 1, in which the concave surface in the step of larger radius and said recess are formed by conical surfaces.

5. A device as claimed in claim 1, in which the concave surface in the step of larger radius and said recess are formed by a combination of conical and spherical surfaces.

6. A device as claimed in claim 1, in which the concave surface in the step of larger radius is formed by a corrugated surface transverse to the optical axis of the light conductor.